United States Patent

Kopec et al.

[15] 3,665,107

[45] May 23, 1972

[54] MONITORING CIRCUIT IN DATA SETS, WITH SIGNAL MUTING

[72] Inventors: Thomas J. Kopec, River Grove; Richard A. Morstadt, Elmhurst, both of Ill.

[73] Assignee: Automatic Electric Laboratories, Inc., Northlake, Ill.

[22] Filed: Nov. 13, 1970

[21] Appl. No.: 89,326

[52] U.S. Cl. ..............................179/4, 178/66 A, 340/152, 179/2 DP

[51] Int. Cl. ..............................H04m 11/06

[58] Field of Search ..............................179/2 DP, 3, 4; 178/58, 66 R, 178/66 A; 340/152 R; 325/64, 348, 402, 478

[56] References Cited

UNITED STATES PATENTS 3,505,474 4/1970 Quatse ..............................179/2 DP 3,426,150 2/1969 Tygart ..............................179/2 DP

*Primary Examiner*—Kathleen H. Claffy

*Assistant Examiner*—Tom D'Amico

*Attorney*—Cyril A. Krenzer, K. Mullerheim, B. E. Franz and Robert J. Black

[57] ABSTRACT

A circuit for use in a data set that permits the user to monitor acknowledgment tones or voice signals from a distant data receiving station, as well as permitting monitoring of tones representing data transmitted by the user's own station. Signal muting of both the data set telephone receiver and an extension telephone are provided to limit the tone levels, as well as isolation from the telephone line to reduce impedance mismatching.

8 Claims, 3 Drawing Figures

INVENTORS
THOMAS J. KOPEC
RICHARD A. MORSTADT
BY
AGENT

"PRIOR ART"

MONITORING CIRCUIT IN DATA SETS, WITH SIGNAL MUTING

BACKGROUND OF THE INVENTION

1. Field of the Invention

The present invention pertains to data sets for use in converting computer or business machine signals into a form acceptable for transmission of data over telephone lines. More specifically the present invention is drawn to a data set that includes a voice answer back circuit with muting provisions.

Data set transmitters like that disclosed herein are designed primarily for use in the nationwide telephone switched network. The data set is installed on subscriber's premises in place of the usual telephone set and includes connections to a computer or other business machine. In addition to acting as an interface between the telephone line and the business machine the data set provides means for transmission of alpha-numeric data characters originated by the business machine and means for receiving signals acknowledging receipt of these transmissions. Conventional telephone operation is also included. The acknowledgment or answer back signal is monitored at the data set. When the data set is in the data mode, it will accept contact closures from external subscriber's equipment (business machines) and translate them into audio frequency signals which are then transmitted over the telephone network to a receiving terminal.

2. Description of the Prior Art

In previous data sets that included answer back circuitry, circuit arrangements were similar to those exemplified by the data set manufactured by the Western Electric Company and designated 401E. Data set signals to be monitored were coupled directly from the telephone line to the data set telephone receiver as well as to an extension telephone if desired. A muting signal was provided only when the data set was transmitting tone signals. During such operation the effective shunting of the data set telephone receiver reduced its response. This technique while satisfactory to reduce the level of tone signals during outgoing signal transmission affected no muting of signals heard by the extension telephone so that such tones were heard at the extension telephone at an uncomfortably high level. Likewise depending upon whether the extension telephone was in use or not the effective terminating impedance of the telephone line was lowered and variable depending upon the on, or off-hook condition of the extension telephone. This resulted in an impedance mismatch which permitted some of the transmitted energy to be reflected, setting the stage for transmission errors. Likewise if for some reason the extension telephone dial was operated it would provide an AC short circuit to the line destroying data or answer back signals on the line at the time.

SUMMARY OF THE INVENTION

The data set voice answer back circuit disclosed herein permits the user to monitor answer back signals in either tone or voice form, received from a distant data receiver, and at a reduced level to monitor his own tone transmissions.

While normally the receiver in the handset associated with the data set is used as a receiving device, an extension telephone may be used in conjunction with the data terminal. The extension telephone does not include a direct current path when the data set's data key is operated placing the data set in the data mode. Alternating current coupling of the extension telephone however is provided and thus the extension telephone can receive answer back signals and transmitted data tones. In the present arrangement answer back and tone signals are applied to an amplifier the output of which is transformer coupled to both the data set handset receiver and to an extension telephone. The muting circuit operated in response to keying of the data set from a business machine is extended to the muting portion of the present circuitry. Likewise voice answer back signals are also applied over the same path. However only during locally generated tone signals will a shunt exist across the primary of the transformer used to couple signals to the data set handset receiver and extension telephone. This shunt effectively reduces the level of signals applied.

DESCRIPTION OF THE PREFERRED EMBODIMENT

Figure 1:
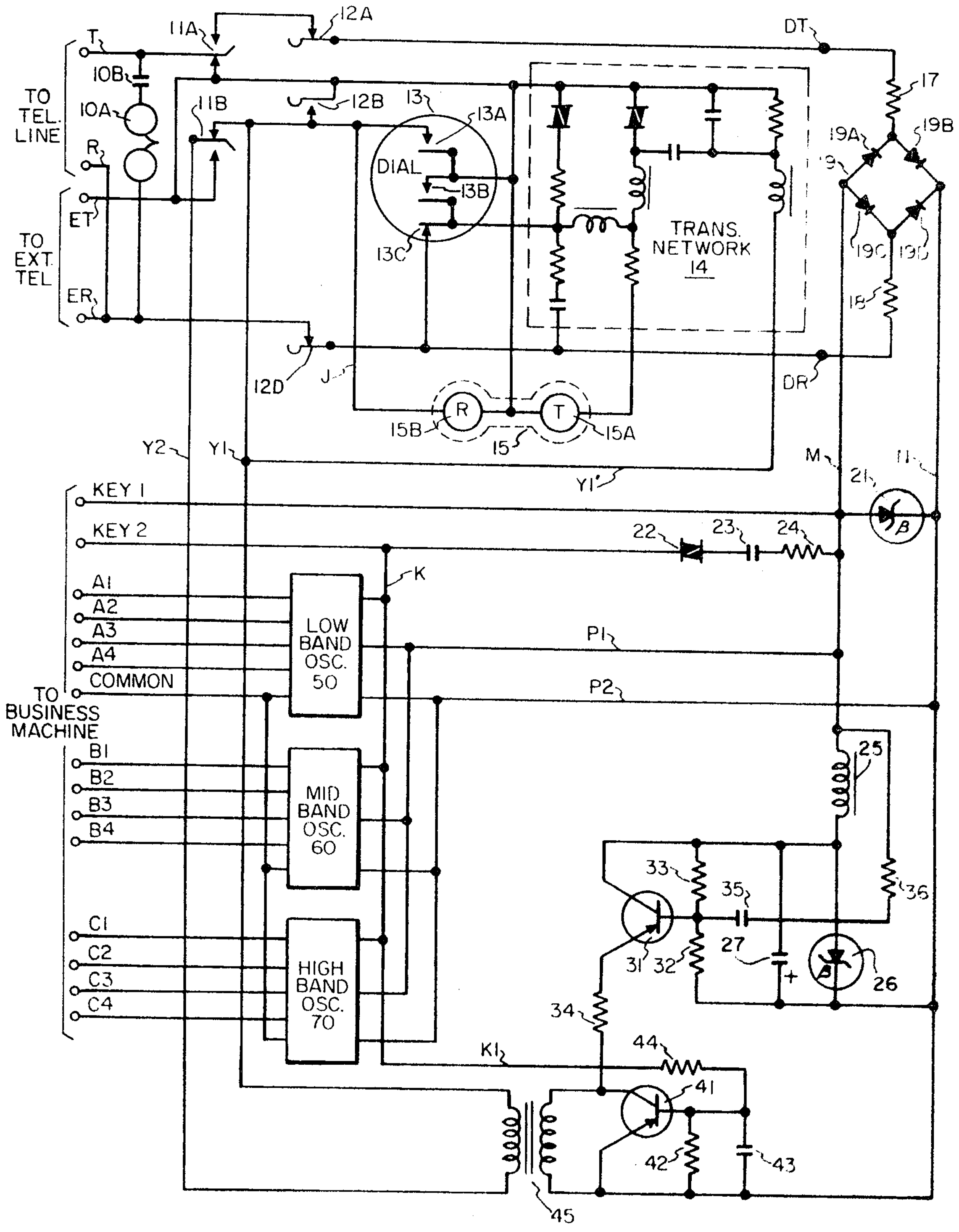
FIG. 1 is a schematic circuit diagram of a data set embodying the present invention.

Referring now to FIG. 1 a data set embodying the present invention is shown. A description of the apparatus of such a data set and basic understanding of its working will be presented in order to facilitate an understanding of the answer back circuitry that forms the present invention.

The data set includes circuitry similar to that of a regular telephone substation in that it includes a ringer 10A, a capacitor 10B, a dial 13 including contacts 13A, 13B and 13C, a hook switch 12 including hook switch contacts 12A, 12B and 12C shown in its operated or "off-hook" position, a transmission network 14 and a telephone handset 15 including a transmitter 15A and receiver 15B.

Also included is a data key 11 consisting of "MAKE-BREAK" spring combinations 11A and 11B. The data key as shown is in its nonoperated or voice mode position. Resistors 17 and 18 provide surge protection while the four diodes 19A, 19B, 19C and 19D comprise bridge circuit 19 which acts as a polarity guard. Additional surge protection is provided by Zener diode 21. Inductor 25 and Zener diode 26 provide line holding circuitry.

Transistor 31 and its associated circuitry act as an amplifier for voice and tone answer back signals. Transistor 41 provides the muting of the answer back circuitry.

Varistor 22, capacitor 23 and resistor 24 provide an oscillator holding network. Oscillators 50, 60 and 70 shown in block form are the units utilized to generate selected tones for use in transmitting signals originated by the connected business machine. Selection of appropriate tones for each oscillator is affected by the business machine over contacts designated A1, A2, A3, A4, B1, B2, B3, B4 and C1, C2, C3 and C4 with a common return path. Keying of the output of the oscillators is also under control of the business machine and is effected over leads designated key 1 and key 2.

The detailed circuitry of the three oscillators 50, 60 and 70 is not shown inasmuch as they may assume any conventional form and do not form a part of the present invention.

Briefly the over-all operation of the data set embodied in the present invention is as follows: the data set is connected to a telephone line at terminals T and R. An extension telephone of conventional design is connected at terminals ET and ER and a computer or similar business machine is connected to the data set at terminals designated: key 1, key 2, A1. through A4 inclusive, B1 through B4 inclusive, C1 through C4 inclusive, and Common.

Assuming now that a subscriber at the data set disclosed in FIG. 1 wishes to establish a connection and then transmit data to a distant point, the subscriber will first remove handset 15 from hook switch 12 placing it in the "off-hook" or operated position as shown in the drawings. Hearing dial tone the subscriber then operates dial 13 in the usual manner to establish the distant connection. Upon receiving an acknowledgment that the connection is completed by virtue of an operator at the distant point responding, (or a distinctive tone being returned) as heard over receiver 15B, the operator then will operate data key 11.

The initial operating path of the data set is from telephone line terminal T through the break contacts 11A of the data key to the transmission network, and from the transmission network through break contact 13C of the dial through hook switch contact 12D to line terminal R. The telephone handset is of course connected to the transmission network.

Operation of the data key make contacts 11A complete the path from the T terminal of the line through operated hook switch contacts 12A via terminal DT and resistor 17 to diode bridge 19; and from the R terminal connected to the telephone line through operated hook switch contacts 12D and resistor 18 to bridge 19.

The subscriber will now place the computer or other business machine in operation where the resultant contact closures in the business machine will cause operation of oscillators 50, 60 and 70 in an obvious manner over the leads designated A1 to A4 inclusive, etc. These oscillators are initially actuated to produce outgoing tone signals by operation of a keying circuit included in the business machine and connected at leads designated key 1 and key 2. The output of each oscillator is applied in parallel by means of a lead K extending through terminal key 2 through the business machine keying circuit and the lead key 1 to the diode bridge 19; the common return path P2 for each oscillator extends to the other side of diode bridge 19.

Thus alternating current signals generated by the oscillators 50, 60 and 70 flow out through the polarity guard formed by bridge 19 and through surge protection resistors 17 and 18 to the telephone line over the previously outlined path. Direct current from the telephone line always holds the polarity guard in a state suitable for transmitting small alternating current signals with negligible loss. When the contact between the leads designated key 1 and key 2 opens after a data transmission ends capacitor 23 permits current to flow in the oscillators for a period of 50 to 100 milli-seconds and so it maintains generation of three rest tones. Resistor 24 and varistor 22 have little influence on this charging time. Resistor 24 controls the peak discharge current when the contact closes and the varistor isolates the oscillators from the line during receipt of answer back signals.

Power for the data transmitter is derived from telephone central office battery via the subscriber line connected at terminals T and R. The polarity guard consisting of bridge 19 provides an output whose polarity is independent of line voltage polarity. Zener diode 21 which breaks down at about 18 volts, absorbs surge currents induced by lightning and protects the transistors 31 and 41. Resistors 17 and 18 limit surge currents to protect Zener diode 21. A portion of the supply current flows over lead P1 to bias the oscillators 50, 60 and 70. A major portion of the current from short subscriber loops, flows through inductor 25 and divides between the amplifier consisting of transistor 31 and Zener diode 26. The regulating property of the Zener diode maintains the collector supply voltage for transistor 31 at proper value with little dependence on the resistance of the subscriber loop. Capacitor 27 bypasses signal frequencies from the amplifier power leads. The inductance of inductor 25 is sufficient to cause little attenuation of signals delivered by the oscillators to the line.

During the transmission of data tones a muting signal via lead K1 from the oscillator is conducted through resistor 44 to the base of transistor 41 causing it to saturate. Since transistor 41 is directly across the primary winding of transformer 45 it acts as a low impedance diverting a significant portion of the alternating current signal across the primary winding of transformer 45. The signal across the primary of transformer 45 was taken through resistor 34 from the emitter of transistor 31 which functioned as an amplifier receiving a tone signal input at its base through capacitor 35 and resistor 36 from the lead extending to keying terminal, key 1.

The signal remaining after muting by transistor 41 is coupled from the primary winding to the secondary winding of transformer 45. From the secondary winding of transformer 45 the signals are conducted to the receiver 15B over a path extending through terminal Y1 and lead J to receiver 15B.

The return path is from receiver 15B through data key make contact 11B and over the armature of data key contacts 11B to the secondary winding of transformer 45. The extension telephone may also monitor these signals over a path extending from terminal ER through hook switch contacts 12D and dial spring break contacts 13C to the transmission network and from the transmission network through terminal Y1 to the secondary winding of transformer 45 with the return path from transformer 45 secondary extending through terminal Y2 and make contacts 11B to terminal ET. Obviously data tones being monitored by either the data set handset receiver or by means of the extension telephone are heard at reduced volume as the result of the muting action of transistor 41.

Assuming now that data transmission is completed, the subscriber at the data set station shown in FIG. 1 will wait for acknowledgment or answer back signals from the distant station, indicating that the data transmitted was successfully received. With the data key 11 still operating the voice acknowledgment or tone answer back signals come from the telephone line and the direct current in the polarity guard system of diode bridge 19 permits these signals to pass over leads M and N. Capacitor 35 couples these signals to the base of amplifier transistor 31.

Transistor 31 is provided with base bias current by a voltage divider consisting of resistors 32 and 33. The emitter current of transistor 31 is determined primarily by resistor 34 since the DC resistance of the primary winding of transformer 45 is quite small. A significant part of the audio signal present at the emitter of transistor 31 thus appears across the primary winding of transformer 45.

Since tone signals are not being produced by the data set, consequently a muting signal is not present on the base of transistor 41. Transistor 41 therefore is not rendered conductive and hence acts as a high impedance path to these signals.

From the secondary of transformer 45 incoming signals are connected via make contacts on data key 11B to the ET lead to the extension telephone and to the transmission network and via conductor Y1 to the transmission network and thereby conducted to receiver 15B and to the extension telephone via lead ER.

Hearing an appropriate response either via the data set handset receiver or the extension telephone, the subscriber at the present data set may then restore the data set to voice operation by restoring data key 11, and restoring handset 15 to hook switch 12, effectively disconnecting the data set from the telephone line.

Figure 2:
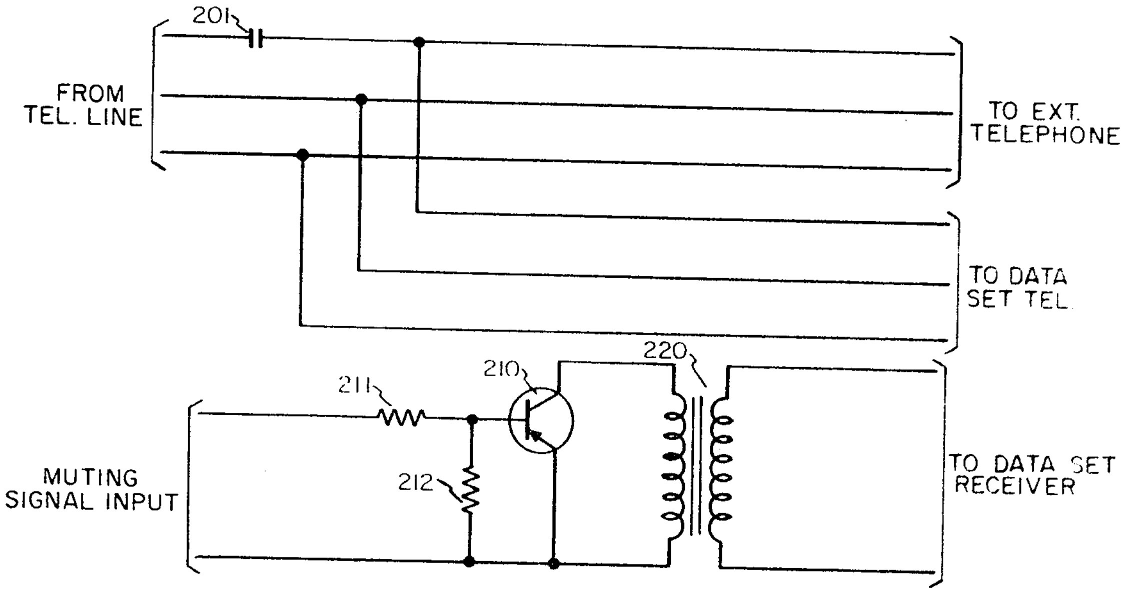
FIG. 2 is a schematic circuit diagram of a prior art voice answer back circuit for use in data sets.

Referring now to FIG. 2 where a voice answer back circuit of a prior art data set is disclosed, the signals which are to be monitored are coupled from the telephone line to the data set handset receiver and to the extension telephone via capacitor 201. The muting signal, which causes reduction of the level of monitored data tones to a comfortable listening volume, is applied to the base of transistor 210, and from the output of transistor 210 to the primary winding of transformer 220. It should be observed that the secondary of transformer 220 is connected directly across only the data sets telephone handset receiver. The primary of transformer 220 is connected across switching transistor 210. When the prior art data set transmits data tones, transistor 210 is made to saturate, thus placing a low impedance across the primary of transformer 220. The secondary of transformer 220 also exhibits a low impedance and since it is across the receiver unit it shunts a significant part of the alternating current signal across the handset receiver, reducing its response.

Since the prior art data set's telephone unit and extension phone are AC coupled to the telephone line via capacitor 201, the effective terminating impedance for the line is lowered and variable depending upon whether the extension phone is "off-hook" or "on-hook." The end result is that an impedance mismatch develops which permits some of the transmitted energy to be reflected causing transmission errors. If the extension phone's dial were operated it would place an alternating current short circuit across the line destroying data or answer back signals on the line at that time. Obviously since the extension telephone is placed directly across the line it also receives full volume as far as tones transmitted by the data set. Muting is applied only to the data set handset receiver.

Referring to associated 3 an answer back circuit according to the present invention is shown. Answer back signals and mute signals are applied over a common path shown as the signal input to the base of transistor 310. Transistor 310 and its associated circuitry serve to isolate the telephone line from the remaining answer back circuitry. From the emitter of transistor 310 signals are extended through resistor 313 to the primary of transformer 330, from the secondary of transformer 330 to the receiver unit of the handset associated with the data set where they may be monitored at full volume. These same signals are also presented to the extension telephone after passing through the transmission net of the data set.

When data tones are transmitted, signals derived from the keying circuit are applied through resistor 323 to the base of transistor 320 causing it to saturate. Since transistor 320 is directly across the primary of transformer 330 it acts to shunt a significant portion of the alternating current signal across the primary of transformer 320. The remaining signal across the primary transformer 330 is coupled to the data set receiver and then to the extension phone as previously described. Thus transmitted data tones are monitored at reduced volume.

Figure 3:
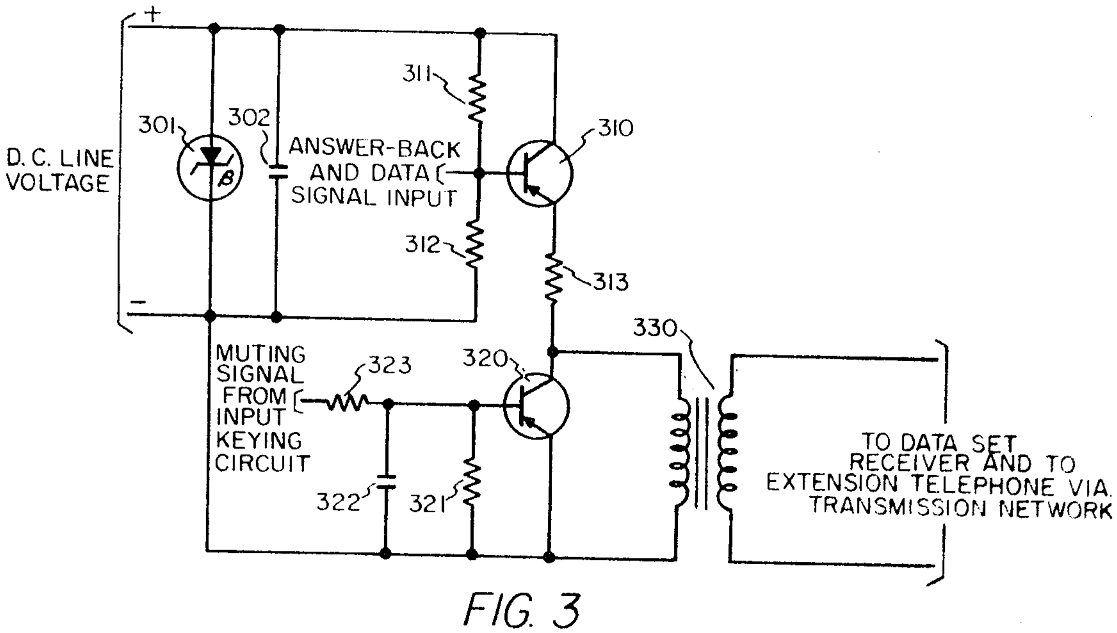
FIG. 3 is a schematic circuit diagram of a voice answer back circuit for use in data sets in accordance with the present invention.

This arrangement as shown also effectively isolates the telephone line via transistor 310. The data set handset receiver and the extension telephone thus presents no added load. A fixed line terminating impedance is thus applied by the circuitry disclosed in FIG. 3. The extension telephone is also isolated from the data set's handset by the data set transmission network as shown in FIG. 1. Thus the extension phone may be dialed with no effect on transmitted data tones or on answer back signals. Inasmuch as the extension phone receives its signals from the data set handset, it too receives muted data tones thus permitting comfortable monitoring.

What is claimed is:

1. In a communication system, a communication channel, connected to said channel a station equipped to transmit data signals and receive acknowledgment signals, said station comprising a data set including data signal generating means operable to generate a plurality of data signals; a business machine connected to said data signal generating means, including keying means operated to condition said data signal generating means and coding means operated to operate said conditioned generating means; said data set further including, circuit means connected between said generating means and said communication channel whereby data signals are conducted to said channel, a first signal transducer, amplifier means connected between said circuit means and said first signal transducer, operated in response to acknowledgment signals received over said communication channel to amplify said acknowledgment signals, and further operated in response to said generated data signals to amplify said data signals, said first transducer operated in response to said amplified acknowledgement signals and to said amplified data signals to reproduce both of said signals, the improvement comprising: muting means connected between said business machine keying means and said amplifier means, operated in response to said keying means to attenuate the level of amplified data signals reproduced by said first transducer means.

2. A communication system as claimed in claim 1 wherein is further included: a second transducer connected to said amplifier means operated in response to said amplified acknowledgment signals and said amplified data signals to reproduce said acknowledgment signals and said data signals, said muting means further operated to attenuate the level of amplified data signals reproduced by said second transducer means.

3. A communication system as claimed in claim 1, wherein: said amplifier means comprise a transistorized amplifier, transformer coupled to said first transducer, and said muting means comprise a transistor operated to place a low impedance path in shunt relationship across the input of said transformer.

4. A communication system as claimed in claim 3 wherein said transistorized amplifier is transformer coupled to said first transducer and to a second transducer.

5. A communication system as claimed in claim 1, wherein; said amplifier means comprise a transistor amplifier of the emitter-follower type including an output transformer having primary and secondary windings, the primary winding of said transformer connected to the emitter of said transistor amplifier and the secondary winding of said transformer connected to said first transducer; said muting means comprising a transistor having its collector-emitter path in shunt relationship across the primary of said transformer and operated in response to said business machine keying means transmitting a signal to the base of said muting means transistor to provide a low impedance path for data signals from said transistor amplifier emitter, whereby a substantial portion of the output of said transistor amplifier is diverted from the primary winding of said transformer.

6. A communication system as claimed in claim 5 wherein there is further included a second transducer connected to the secondary winding of said transformer.

7. A communication system as claimed in claim 1 wherein: said amplifier means isolate said first transducer from said communication channel, to provide a substantially constant impedance termination for said communication channel.

8. A communication system as claimed in claim 2 wherein said amplifier means isolate said first transducer and said second transducer from said communication channel to provide a substantially constant impedance termination for said communication channel.

* * * * *